(12) United States Patent
Khanka et al.

(10) Patent No.: US 8,682,377 B1
(45) Date of Patent: Mar. 25, 2014

(54) SYSTEMS AND METHODS FOR ADJUSTING THE POWER CONTROL SETTINGS IN A WIRELESS COMMUNICATION NETWORK

(75) Inventors: Bhagwan Khanka, Lenexa, KS (US); John W. Prock, Raymore, MO (US); Shilpa Kowdley Srinivas, Brambleton, VA (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 516 days.

(21) Appl. No.: 12/869,407

(22) Filed: Aug. 26, 2010

(51) Int. Cl.
*H04B 7/00* (2006.01)
(52) U.S. Cl.
USPC .......................... 455/522; 455/405; 370/318
(58) Field of Classification Search
USPC ......... 455/522, 405, 69, 67.1, 408, 63.1, 432, 455/435, 436, 437, 438, 552; 370/328, 338, 370/401, 318, 335
See application file for complete search history.

(56) References Cited

U.S. PATENT DOCUMENTS

| 6,298,241 | B1 | 10/2001 | Hong |
| 6,434,387 | B1 * | 8/2002 | Lee ............................... 455/436 |
| 6,587,696 | B1 | 7/2003 | Ma |
| 6,609,008 | B1 | 8/2003 | Whang |
| 6,735,247 | B2 | 5/2004 | Lundby |
| 2003/0100269 | A1 * | 5/2003 | Lehtinen et al. ................ 455/69 |
| 2004/0254868 | A1 * | 12/2004 | Kirkland et al. ................ 705/35 |
| 2004/0260630 | A1 * | 12/2004 | Benco et al. .................... 705/30 |
| 2006/0187871 | A1 * | 8/2006 | Jones ........................... 370/328 |
| 2006/0246936 | A1 * | 11/2006 | Gross et al. ................... 455/522 |
| 2007/0191044 | A1 | 8/2007 | Kostic |

FOREIGN PATENT DOCUMENTS

| WO | WO 02 052757 | 7/2002 |
| WO | WO 2004 042937 | 5/2005 |

* cited by examiner

*Primary Examiner* — Charles Appiah
*Assistant Examiner* — Alexander Yi

(57) ABSTRACT

Systems and methods for adjusting the power control settings in a wireless communication network are provided. In one embodiment, a base station determines a target access terminal's use of service so far in a billing period, wherein the target access terminal is located in a sector of the wireless communication network. The base station then determines whether the target access terminal's use of service is above a threshold value. Responsive to the base station determining that the target access terminal's use of service is above the threshold value, the base station adjusts a power control setting of one or more other access terminals located in the sector of the wireless communication network.

20 Claims, 4 Drawing Sheets

SYSTEMS AND METHODS FOR ADJUSTING THE POWER CONTROL SETTINGS IN A WIRELESS COMMUNICATION NETWORK

BACKGROUND

To provide cellular wireless communication service, a wireless service provider typically operates a radio access network (RAN) that defines one or more wireless coverage areas in which access terminals (ATs) can be served by the RAN and can thereby obtain connectivity to broader networks such as the public switched telephone network (PSTN) and the Internet.

A typical RAN may include one or more base transceiver stations (BTSs) (e.g., macro network cell towers and/or femtocells), each of which may radiate to define a wireless coverage areas such as cells and cell sectors in which ATs can operate. Further, the RAN may include one or more base station controllers (BSCs) or the like, which may be integrated with or otherwise in communication with the BTSs, and which may include or be in communication with a switch or gateway that provides connectivity with one or more transport networks. Conveniently with this arrangement, an AT that is positioned within coverage of the RAN can then communicate with a BTS and in turn, via the BTS, with other served devices or with other entities on the transport network.

In general, a RAN will communicate with an AT according to an agreed air interface protocol, examples of which include CDMA, iDEN, WiMAX, LTE, TDMA, AMPS, GSM, GPRS, UMTS, or EDGE, and others now known or later developed. The air interface protocol will define a mechanism to distinguish communications in one coverage area from those in adjacent coverage areas and to distinguish between communications within a given coverage area. For instance, under the CDMA protocol, each sector has a unique "PN offset" that is used to encode communications carried out in the sector in a manner that distinguishes communications carried in adjacent sectors. Further, each sector defines various control channels and traffic channels, each encoded with a respective "Walsh code." Other examples are possible as well.

A RAN will typically broadcast a pilot signal or the like respectively in each coverage area, to enable user devices to detect and evaluate cellular coverage in that area. For instance, when a user device is operating on an assigned traffic channel in a given coverage area, the user device may regularly monitor the strength of the pilot signal in that coverage area and may likewise monitor the strength of pilot signals that may come from nearby coverage areas. If the pilot signal from an adjacent coverage area becomes sufficiently stronger than the pilot signal in the current coverage area, the user device may then engage in control channel signaling with the RAN to arrange for a handoff from the current coverage area to the adjacent coverage area.

Under some communications protocols, such as 1xEV-DO, data transmitted on the forward link (from the BTS to the AT) is defined in terms of frames. These frames are divided into a number of time slots, each slot being approximately 1.667 ms in length. The AT may regularly measure the frame error rate (FER) on the forward link. The FER is the ratio of the number of bad frames to the total number of frames received by the AT for a period of time. The AT may periodically report the FER measurements to the BSC using Power Measurement Report messages. In turn, the BSC may adjust the BTS's forward power based on the FER reported by the AT. If the FER is high, the BSC may increase the BTS's forward power, to improve call fidelity, for instance. If the FER is low, the BSC may decrease the BTS's forward power, so as to direct resources elsewhere.

Wireless service providers typically require that users pay a fee in order to receive service. In some instances, users are allotted a certain amount of minutes (or a certain amount of data) per month, and the wireless service provider monitors the user's usage.

OVERVIEW

Systems and methods for adjusting the power control settings in a wireless communication network are provided. In one embodiment, a base station determines a target access terminal's use of service so far in a billing period, wherein the target access terminal is located in a sector of the wireless communication network. The base station then determines whether the target access terminal's use of service is above a threshold value. Responsive to the base station determining that the target access terminal's use of service is above the threshold value, the base station adjusts a power control setting of one or more other access terminals located in the sector of the wireless communication network.

In another embodiment, for each of a plurality of access terminals located in a sector of the wireless communication network, a base station determines the access terminal's use of service so far in a billing period. The base station then selects a usage level from a plurality of usage levels, wherein the selected usage level is based on the access terminal's use of service so far in a billing period. Next, the base station assigns the selected usage level to the access terminal. The base station then adjusts a power control setting of the access terminal, wherein the adjusted power control setting is based on the usage level assigned to the access terminal.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
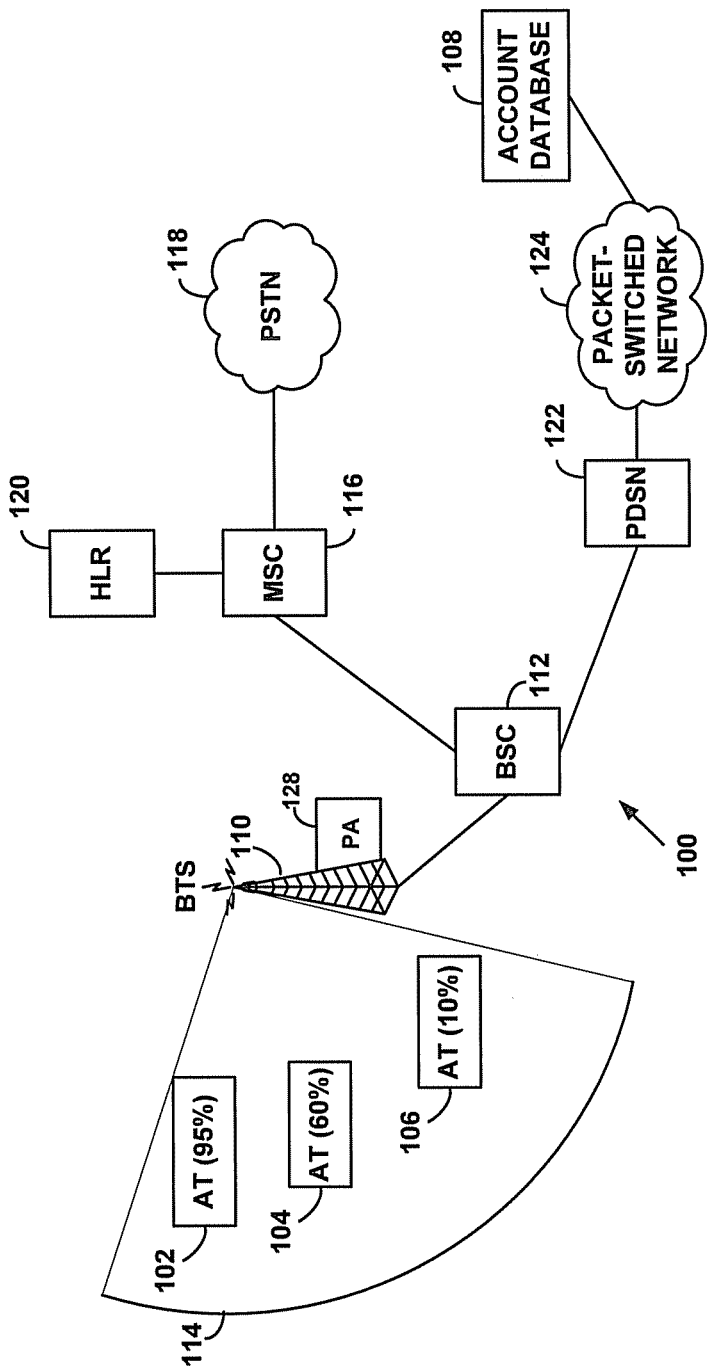
FIG. 1 is a simplified block diagram depicting a wireless communication system in which an embodiment of the present methods can be implemented.

FIG. 1 shows a simplified block diagram of a wireless communication system 100 that is operated by a wireless service provider. As shown, ATs 102, 104, and 106 communicate over an air interface with a BTS 110. As indicated by way of example, AT 102 has used 95% of its monthly service allotment, AT 104 has used 60% of its monthly service allotment, and AT 106 has used 10% of its monthly service allotment.

ATs 102, 104, and 106 are located in sector 114, which may be defined through use of directional antennas and/or by various modulation parameters, including, without limitation, carrier frequencies and PN offsets or other parameters.

ATs 102, 104, and 106 are in active communication with BTS 110 in the sense that they each have an assigned air interface traffic channel in sector 114.

As further shown in FIG. 1, BTS 110 includes a respective power amplifier 128, which may be used to amplify air interface transmission power. Power amplifier 128 may have an adjustable gain, and the total transmission power provided by the power amplifier may be allocated among various co-existing air interface channels in the coverage area. For instance, if the air interface protocol used by the RAN defines overhead control channels (e.g. paging channel, sync channel, and pilot channel) and selectively assignable traffic channels, BTS 110 may be set to allocate its total transmission power among those various channels. BTS 110 may output control channel transmissions at fixed transmission power levels, and the BTS may then allocate some or all of the remaining available power among assigned traffic channels. Further, the power amplifier itself will have a maximum gain. Thus, the maximum amplifier gain and the maximum allowed power per traffic channel may cooperatively define a practical limit on the extent to which the RAN can increase traffic channel transmission power for communication to any given user device.

BTS 110 is coupled to or integrated with BSC 112. BSC 112 may control one or more BTSs and may manage aspects of air-interface operation. For instance, BSC 112 may manage assignment of air-interface traffic channels to ATs in response to AT origination messages. As another example, BSC 112 may function to control transmission power used by serving BTS 110 to communicate with each AT. In particular, for each coverage area under its control, BSC 112 may maintain a record of the transmission power being used on each assigned traffic channel and a record of the total available transmission power, and BSC 112 may engage in control signaling with BTS 110 to adjust the power control settings as necessary.

BSC 112 may also function to assign an AT to a specific traffic channel based on that AT's use of service so far in a billing period. For example, BSC 112 may function to assign an AT with a high use of service to a traffic channel with a high amount of gain. Similarly, BSC 112 may function to assign an AT with a low use of service to a traffic channel with a low amount of gain.

BSC 112 may function to receive from an AT a number of Power Management Report messages that specify the forward link FER. Based on the FER, BSC 112 may engage in control signaling with BTS 110 to adjust transmission power. For example, BSC 112 may have associated with each AT an FER threshold value. If the FER reported by the AT is higher than that AT's FER threshold value, BSC 112 may instruct BTS 110 to increase transmission power.

BSC 112 may further function to adjust a particular AT's FER threshold value based on that AT's use of service so far in the billing period. As an example, if the AT's use of service is low, BSC 112 may adjust the AT's FER threshold to a higher value. If the AT's use of service is high, BSC 112 may adjust the AT's FER threshold to a lower value.

Throughout this description, the term "base station" will be used to refer to a RAN element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group.

BSC 112 is connected to a mobile switching center (MSC) 116, which acts to control assignment of air traffic channels (e.g., over the air interface), and provides access to wireless circuit-switched services such as circuit-voice and circuit-data (e.g., modem-based packet data) service. As represented by its connection to PSTN 118, MSC 116 is also coupled with one or more other MSCs, other telephony circuit switches in the operator's (or in a different operator's) network, or other wireless communication systems, thereby supporting user mobility across MSC regions, roaming between systems, and local and long-distance landline telephone services. Also connected to MSC 116 is home location register (HLR) 120, which supports mobility-related aspects of subscriber services, including dynamic tracking of subscriber registration location and verification of service privileges.

As shown, BSC 112 is also connected with a packet data serving node (PDSN) 122. PDSN 122 provides connectivity with a packet-switched network 124, such as the Internet and/or a wireless carrier's private core packet-network.

Also connected to packet-switched network 124 is an account database 108. Generally speaking, account database 108 contains subscriber account records, each of which may indicate an extent of a subscriber's current usage in a billing period, and may further indicate other subscriber information, such as service profile information for instance. Account database 108 may periodically receive usage reports from BSC 112, PDSN 122, or MSC 116 detailing a subscriber's usage, and use the information in the usage reports to update usage information for that subscriber. Account database 126 could be coupled via a core network with MSC 116 and could receive call data records (CDRs) for instance (for voice calls) or may receive IP data records (IPDRs) from PDSN 122 or an accounting, authorization, and authentication server (not shown) for instance.

It should be understood that the depiction of just one of each network element in FIG. 1 is illustrative, and there could be more than one of any of them, as well as other types of elements not shown. The particular arrangement shown in FIG. 1 should not be viewed as limiting. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of non-transitory computer-readable storage and executable by the one or more computer processors to carry out the functions, steps, and procedures of the various embodiments of the present invention described herein. Similarly, a communication device such as exemplary AT 102 typically comprises a user interface, I/O components, a communication interface, a tone detector, a processing unit, and data storage, all of which may be coupled together by a system bus or other mechanism. As such, the various systems and entities described herein are collectively representative of examples for implementing and carrying out the various functions, steps, and procedures described herein. Additionally, although various elements (for example, BSC 112) are depicted separately in FIG. 1, two or more elements may be combined into a single device in practice.

Figure 2:
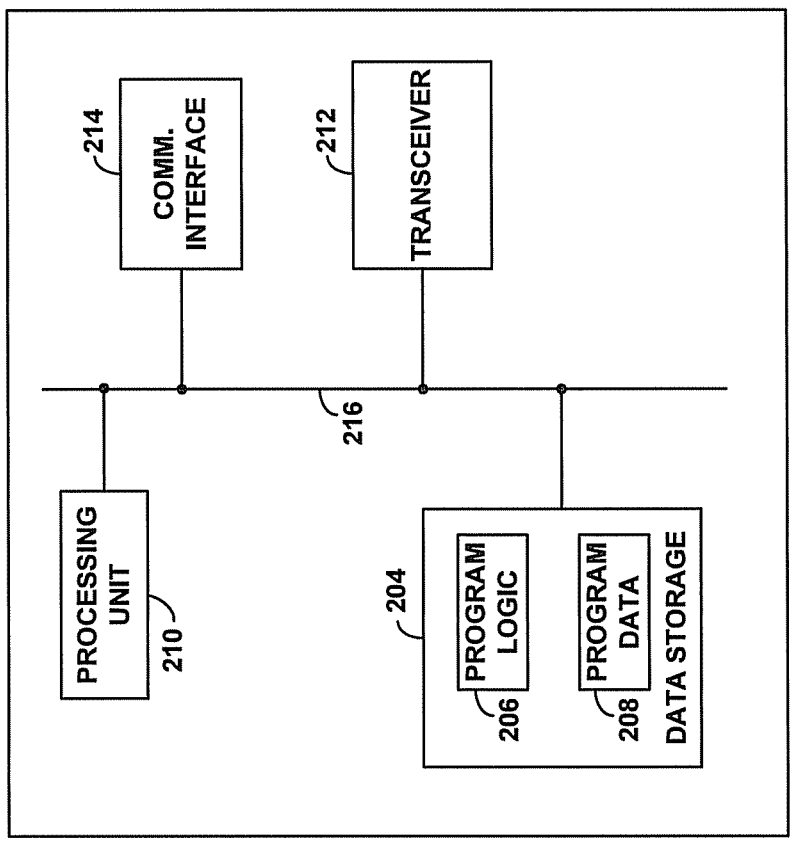
FIG. 2 is a simplified block diagram of an exemplary base station.

FIG. 2 is a simplified block diagram depicting functional components of an example base station that can carry out aspects of the methods disclosed herein. As shown in FIG. 2, the example base station includes data storage 204, processing unit 210, transceiver 212, communication interface 214, and a system bus 216 or other mechanism.

These components may be arranged to support conventional operation in a wireless communication system that is compliant with the CDMA family of protocols, such as the wireless communication system illustrated in FIG. 1. The details of such an arrangement and how these components function to provide conventional operation are known in the art, and are not described further herein.

Communication interface 214 in combination with transceiver 212, which may include one or more antennas, supports forward and reverse-link channels for communications with the network, including receiving and responding to access request messages, and the transmission and reception of various system messages that convey access request information, synchronization information, BTS location information, and BTS power transmission information, etc. The communication interface may include a module, such as an MSM™-series chipset made by Qualcomm Inc. of San Diego, Calif., and support wireless packet-data communications according to the CDMA family of protocols by way of example.

Processing unit 210 may comprise one or more general-purpose processors (e.g., INTEL microprocessors) and/or one or more special-purpose processors (e.g., dedicated digital signal processor, application specific integrated circuit, etc.). In turn, the data storage 204 may comprise one or more volatile and/or non-volatile storage components, such as magnetic or optical memory or disk storage. Data storage 204 can be integrated in whole or in part with processing unit 210, as cache memory or registers for instance. Data storage 204 may be configured to hold both program logic 206 and program data 208.

Program logic 206 may comprise machine-language instructions that define routines executable by processing unit 210 to carry out various functions described herein. For example, the program logic, communication interface, and transceiver may operate cooperatively to carry out logical operation such as that discussed below and illustrated in FIGS. 3 and 4. Program data 208 could also comprise storage for various parameters used in the methods discussed below.

In one embodiment, program data 208 could include data that specifies various threshold values, such as a use-of-service threshold value, and FER threshold values associated with each AT the base station is serving. As discussed below, the base station could compare a target AT's use of service against the use-of-service threshold value. When the target AT's use of service is above the use-of-service threshold, the base station could adjust the FER threshold values of other mobile stations being served by the station to a level that is lower than the FER threshold value of the target AT.

In another embodiment, program data 208 could include mapping data that defines data usage levels for a range of ATs. Table 1 below is illustrative:

TABLE 1

| Usage Level | Amount of Service Used | FER Threshold | Traffic Channel Gain | Traffic Channel Max Power |
|---|---|---|---|---|
| 1 | Between 0 and 20% | 4% | −5 dB | 18 dBm |
| 2 | Above 20%, below 90% | 2% | −2 dB | 20 dBm |
| 3 | Above 90% | 1% | 0 dB | 23 dBm |

It should be understood that the values in this table are exemplary, and that other values may be used as well. As discussed below, upon determining an AT's current use of service so far in the billing period, BSC 112 could access this mapping data to assign to the AT an FER threshold value, a traffic channel gain value, and/or a traffic channel having a desired gain.

Figure 3:
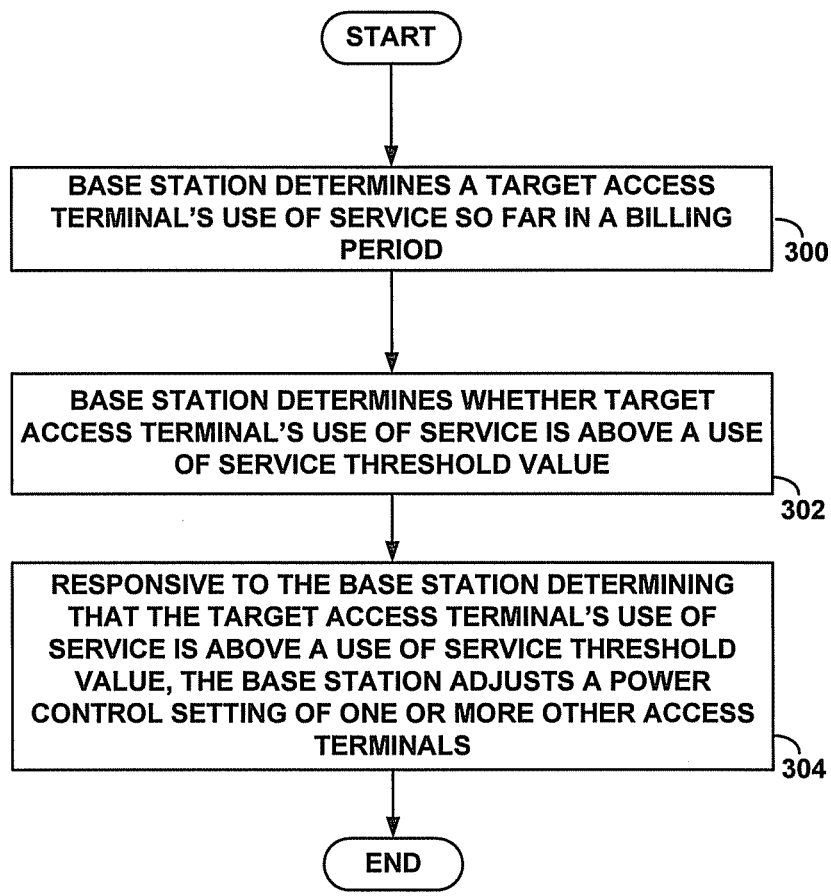
FIG. 3 is a flow chart depicting functions that can be carried out in accordance with an exemplary method.

FIG. 3 is a flow chart depicting functions that can be carried out by a base station (for example BSC 112) in accordance with an embodiment. Generally, FIG. 3 depicts a method for a base station to use a target AT's use of service so far in a current billing period as a basis for adjusting one or more other ATs' power control settings.

As shown in FIG. 3, at block 300, BSC 112 determines a target AT's use of service so far in a billing period. In this example, the target AT is AT 102 in FIG. 1. There are several ways in which BSC 112 could determine target AT 102's current use of service in the billing period. For example, BSC 112 could receive a message (for example, from target AT 102, or from another entity, such as account database 108) that includes data specifying target AT 102's use of service so far in the billing period. BSC 112 could then extract the data from the message to obtain target AT 102's current use of service. As another example BSC 112 itself could maintain information about target AT 102's use of service.

At block 302, BSC 112 determines whether target AT 102's use of service is above a use-of-service threshold value. The use-of-service threshold value may, for example, be stored in program data 208, and may be provided by a network operator. At block 304, responsive to BSC 112 determining that target AT 102's use of service is above the use-of-service threshold value, BSC 112 adjusts a power control setting of one or more other ATs located in the wireless communication network. In this example, the other ATs are AT 104 and AT 106.

There are several ways in which BSC 112 could adjust the power control settings for the other ATs. For example, in response to determining that AT 102's use of service is above the use-of-service threshold, BSC 112 could query program data 208 to determine an FER threshold associated with the target AT 102. BSC 112 could then query program data 208 to determine the FER thresholds associated with other ATs in the sector (in this example ATs 104 and 106), and compare the other ATs' FER thresholds with the FER threshold of target AT 102. For each of the other ATs in the sector, when the other AT's FER threshold is the same or less than target AT 102's FER threshold, BSC 112 could adjust the other AT's FER threshold so that it is higher than AT 102's FER threshold. Consequently, in response to Power Management Report messages from ATs 102, 104, and 106, BSC 112 is more likely to instruct BTS 110 to increase the transmission power to target AT 102 than to ATs 104 and 106, because AT 102's FER threshold is lower than AT 104 and AT 106's adjusted FER threshold.

As another example, BSC 112 could adjust the traffic channel gain for the other ATs 104 and 106 to make the adjusted traffic channel gain for ATs 104 and 106 lower than the traffic channel gain for target AT 102. Alternatively, BSC 112 could adjust the traffic channel gain for target AT 102 such that the adjusted traffic channel gain for target AT 102 is higher than the traffic channel gain for the other ATs 104 and 106.

Figure 4:
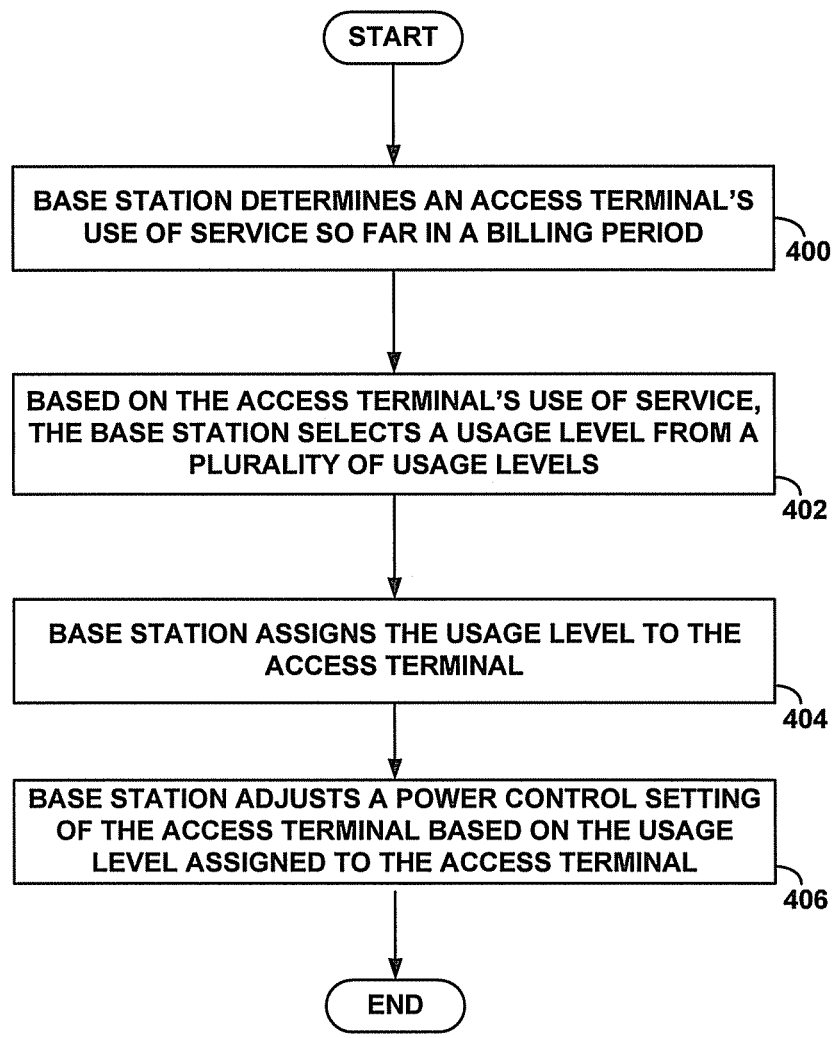
FIG. 4 is a flow chart depicting functions that can be carried out in accordance with an alternate method.

FIG. 4 is a flow chart depicting functions that can be carried out by a base station (for example BSC 112) in accordance an alternate embodiment. Generally, FIG. 4 depicts a method for a base station to assign usage levels to the ATs it is serving based on the ATs' use-of-service in a current billing period, and to adjust the ATs' power control settings based on their assigned usage level.

As shown in FIG. 4, at block 400, for each of a plurality of ATs located in a sector of the wireless communication network, BSC 112 determines the AT's use of service so far in a billing period. There are several ways in which BSC 112 could determine the AT's current use of service in the billing period, including, for example, the methods discussed above with respect to block 300 of FIG. 3.

At block 402, for each of the plurality of ATs, BSC 112 selects a usage level from a plurality of usage levels, wherein the selected usage level is based on the AT's use of service so far in a billing period. For example, referring to Table 1 above, if the AT's use of service is above 90% of its monthly allotted usage, BSC 112 may select a level of "3".

At block 404, for each of the plurality of ATs, BSC 112 assigns the selected usage level to the AT. Referring to Table 1, AT 102 would be assigned a usage level a "3," AT 104 would be assigned a usage level of "2," and AT 106 would be assigned a usage level of "1." Next, at block 406, for each of the plurality of ATs, BSC 112 adjusts a power control setting of the AT based on the usage level assigned to the AT. For example, as shown in Table 1, each usage level has associated with it an FER threshold, a traffic channel gain value, and a traffic channel. BSC 112 may assign one or more of these values to the AT. For example, BSC 112 may assign to the AT the FER threshold associated with the AT's usage level. As another example, BSC 112 may assign to the AT the traffic channel gain associated with the AT's usage level. As yet another example, BSC 112 may assign to the AT the traffic channel associated with the AT's usage level.

Embodiments of the invention have been described above. Those of ordinary skill in the art will appreciate, however, that modifications may be made while remaining within the scope of the invention as defined by the claims.

What is claimed is:

1. In a wireless communication network, a method comprising: a base station determining how much of an allotted amount of service a target access terminal has used so far in a billing period, wherein the target access terminal is located in a sector of the wireless communication network; the base station determining whether the target access terminal has used more than a threshold amount of service; and responsive to the base station determining that the target access terminal has used more than the threshold amount of service, the base station adjusting a power control setting of one or more other access terminals located in the sector of the wireless communication network, wherein the adjusting causes traffic channel gain for the one or more other access terminals to be lower than traffic channel gain for the target access terminal.

2. The method of claim 1, wherein the base station adjusting the power control setting of one or more other access terminals located in the sector of the wireless communication network comprises:
the base station determining a frame error rate threshold associated with the target access terminal; and
based on the determined frame error rate threshold of the target access terminal, the base station assigning to each of the one or more other access terminals a frame error rate threshold that is higher than the determined frame error rate threshold.

3. The method of claim 1, wherein the base station adjusting the power control setting of one or more other access terminals located in the sector of the wireless communication network comprises:
the base station adjusting a traffic channel gain for the one or more other access terminals.

4. The method of claim 1, wherein the base station adjusting the power control setting of one or more other access terminals located in the sector of the wireless communication network comprises:
the base station adjusting a traffic channel gain for the target access terminal.

5. The method of claim 1, wherein the base station determining whether the target access terminals has used more than the threshold amount of service comprises: the base station receiving a message, wherein the message includes data specifying how much service the target access terminal has used; the base station extracting from the data the amount of service that the target access terminal has used so far in the billing period; and the base station comparing the amount of service that the target access terminal has used so far in the billing period to the threshold value.

6. The method of claim 5, wherein the base station receiving the message comprises the base station receives the message from the target access terminal.

7. The method of claim 5, wherein the base station receiving the message comprises the base station receiving the message from a billing controller.

8. In a wireless communication network, a method comprising: for each of a plurality of access terminals located in a sector of the wireless communication network, a base station: determining how much of an allotted amount of service the access terminal has used so far in a billing period for the access terminal; selecting a usage level from a plurality of usage levels, wherein the selected usage level is based on how much of the allotted amount of service the access terminal's use of service has used so far in a billing period; assigning the selected usage level to the access terminal; and adjusting a power control setting of the access terminal and one or more other access terminals located in the sector of the wireless communication network, wherein the adjusted power control setting is based on the usage level assigned to the access terminal and the adjusting causes traffic channel gain for the one or more other access terminals to be lower than traffic channel gain for the target access terminal.

9. The method of claim 8, wherein each level of the plurality of usage levels comprises a frame error rate threshold; and
wherein assigning the selected usage level to the access terminal comprises assigning the frame error rate threshold to the access terminal.

10. The method of claim 9, wherein each of the plurality of usage levels comprises a traffic channel gain value; and
wherein assigning the selected usage level to the access terminal further comprises assigning the traffic channel gain value to the access terminal.

11. The method of claim 8, wherein each of the plurality of usage levels comprises a traffic channel gain value; and
wherein assigning the selected usage level to the access terminal further comprises assigning the traffic channel gain value to the access terminal.

12. The method of claim 8, wherein the base station determining the how much of an allotted amount of service the access terminal has used use of service so far in a billing period for the access terminal comprises: the base station receiving a message, wherein the message includes data specifying the how much of an allotted amount of service the access terminal has used use of service so far in the billing period.

13. The method of claim 12, wherein the base station receiving the message comprises the base station receiving the message from the access terminal.

14. The method of claim 13, wherein the base station receiving the message comprises the base station receiving the message from an account database.

15. A base station operable in a wireless communication network, the base station comprising: a communication interface; a processor; data storage; and program logic in the data storage and executable by the processor to (i) determine how much of an allotted amount of service a target access terminal has used so far in a billing period, wherein the target access terminal is located in a sector of a wireless communication network, (ii) determine whether the target access terminals has used more than a threshold amount of service, and (iii) responsive to the determination that the target access terminal has used more than a threshold amount of service, adjust a power control setting of one or more other access terminals located in the sector of the wireless communication network, wherein the adjusting a power control setting of one or more other access terminals causes traffic channel gain for the one or more other access terminals to be lower than traffic channel gain for the target access terminal.

16. The base station of claim 15, wherein the program logic in the data storage and executable by the processor to adjust the amount of power the base station provides to one or more other access terminals located in the sector of the wireless communication network further comprises:
 program logic in the data storage and executable by the processor to (i) determine a frame error rate threshold associated with the target access terminal, and (ii) based on the determined frame error rate threshold of the target access terminal, assign to each of the one or more other access terminals a frame error rate threshold that is higher than the determined frame error rate threshold.

17. The base station of claim 15, wherein the program logic in the data storage and executable by the processor to provide the one or more other access terminals with less power than the base station provides to the target access terminal comprises:
 program logic in the data storage and executable by the processor adjust a traffic channel gain for the other access terminals.

18. The base station of claim 15, wherein the program logic in the data storage and executable by the processor to provide the one or more other access terminals with less power than the base station provides to the target access terminal comprises:
 program logic in the data storage and executable by the processor adjust a traffic channel gain for the target access terminal.

19. The base station of claim 15, wherein the program logic in the data storage and executable by the processor to determine whether the target access terminal's use of service is above the threshold value comprises: program logic in the data storage and executable by the processor to (i) receive a message, wherein the message includes data specifying how much service the target access terminal has used so far in the billing period, (ii) extract from the data the amount of service that the target access terminal has used so far in the billing period, and (iii) compare the amount of service that the target access terminal has used so far in the billing period to the threshold value.

20. The base station of claim 19, wherein the program logic in the data storage and executable by the processor to receive the message further comprises:
 program logic in the data storage and executable by the processor to receive the message from the target access terminal.

* * * * *